No. 889,020. PATENTED MAY 26, 1908.
H. T. KELLOGG.
KETTLE PROTECTOR.
APPLICATION FILED FEB. 18, 1908.
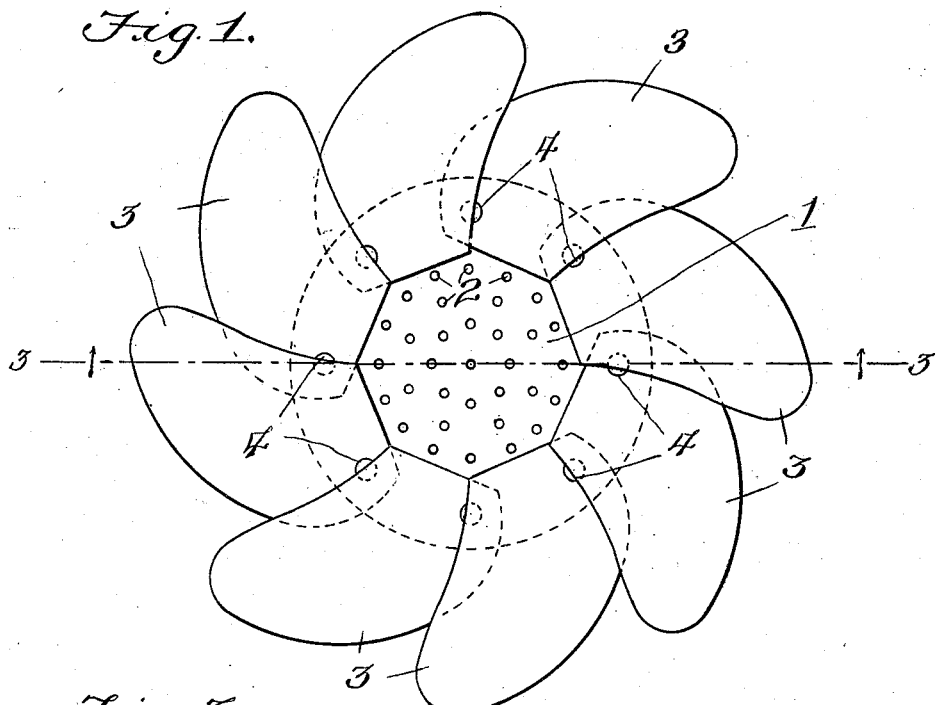
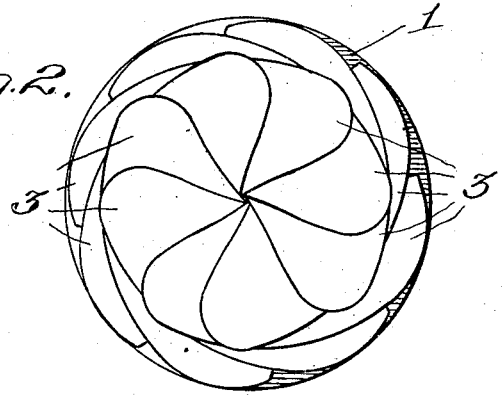
Witnesses
Inventor
Helena T. Kellogg,
By
Attorney

UNITED STATES PATENT OFFICE.

HELENA T. KELLOGG, OF DAYTON, OHIO.

KETTLE-PROTECTOR.

No. 889,020.  Specification of Letters Patent.  Patented May 26, 1908.

Application filed February 18, 1908. Serial No. 416,476.

*To all whom it may concern:*

Be it known that I, HELENA T. KELLOGG, a citizen of the United States of America, residing at Dayton, in the county of Montgomery and State of Ohio, have invented new and useful Improvements in Kettle-Protectors, of which the following is a specification.

This invention relates to adjustable kettle protectors, and one of the principal objects of the same is to provide a simple and efficient device to be placed upon the bottom of a kettle to prevent food from sticking to said bottom while cooking and thus prevent the scorching or burning of the food.

Another object of the invention is to provide a simple device having a series of adjustable radial arms or plates which will cover substantially the entire bottom of the kettle and thus prevent the food from getting underneath the protector.

These and other objects may be attained by means of the construction illustrated in the accompanying drawing, in which,—

Figure 1 is a plan view of the kettle protector and showing the radially disposed plates or arms thrown outward. Fig. 2 is a similar view with the plates or arms swung inward upon the central plane. Fig. 3 is a sectional view on the line 3—3 of Fig. 1.

Referring to the drawing for a more specific description of my invention, the numeral 1 designates a sheet metal disk or plate provided with a series of perforations 2. Pivotally connected to the disk 1 is a series of plates or arms 3, said plates or arms being pivoted at 4 to swing inwardly and outwardly. It is to be noted that the plates 3 overlap each other so that when swung outwardly upon the pivots 4 the protector will substantially cover the bottom of the kettle and hold the food from contact with the bottom and thus prevent its being burned or scorched.

My device is of simple construction, can be manufactured at slight cost, will operate efficiently for its purpose and can be adjusted for various sizes of kettles.

Having thus described the invention, what is claimed as new is:—

1. A kettle protector comprising a metal disk provided with a series of perforations and a series of plates pivoted near the outer edge of said disk and adapted to be swung inwardly or outwardly to cover the bottom of the kettle to prevent burning of the food.

2. A kettle protector comprising a perforated disk, a series of plates pivoted near the outer edge of said disk, said plates overlapping each other and adapted to be swung inwardly or outwardly to fit various sizes of kettles.

In testimony whereof I affix my signature in presence of two witnesses.

HELENA T. KELLOGG.

Witnesses:
 HARRY HEATER,
 THADDEUS W. WHEELER.